United States Patent Office

3,471,583
Patented Oct. 7, 1969

3,471,583
PALLADIUM CATALYSTS
Harold W. Fleming, Middletown, Ky., assignor to Catalysts and Chemicals Inc., Louisville, Ky., a corporation of Delaware
No Drawing. Continuation-in-part of application Ser. No. 594,336, Nov. 9, 1966. This application Oct. 3, 1968, Ser. No. 764,931
Int. Cl. C07c 5/02, 11/00
U.S. Cl. 260—677      3 Claims

ABSTRACT OF THE DISCLOSURE

Palladium on alumina catalysts are well known as selective hydrogenation catalysts. However it is difficult to prepare low surface area palladium on alumina catalysts because strength properties are partially destroyed by the required heating. Catalysts having superior strength properties can be made if the aluminum oxide matrix is modified with one to five percent nickle-alumina spinel.

---

This application is a continuation-in-part of Ser. No. 594,336 filed Nov. 9, 1966 and now abandoned.

This invention in one of its aspects relates to the preparation of new and improved multi-component catalysts. In another of its aspects the invention relates to novel catalysts comprising palladium distributed on a porous carrier or catalyst base.

The use of palladium catalysts has increased markedly in recent years, and these catalysts have been suggested for use in a variety of reactions at elevated temperatures, for instance, aromatization, cyclization, isomerization, cracking and hydrocracking. Such catalysts have come into widespread use in hydrogenation reactions, specially for the hydrogenation of acetylenes in the presence of olefins. Palladium hydrogenation catalysts are thus well known in the art. They have been prepared in numerous ways, such as by impregnating an absorbent support with the noble metal salt solution and evaporating the solution of said salt in the presence of the support. Another method involves the precipitation of palladium hydroxide in the presence of an inert support by adding a palladium chloride solution to a hot solution of sodium carbonate in which the support is suspended. Still another procedure is to add the carbonate to the palladium chloride.

A wide variety of supports have been used for palladium in the selective hydrogenation of acetylenes. Supports which have been tried are those normally used in other hydrogenation reactions. Examples are diatomaceous earth, such as kieselguhr and other siliceous materials; inorganic salts, such as barium sulfate; and, carbonaceous materials, such as activated carbon and the like. However, interest has now centered mainly on alumina as a catalyst base.

For selective hydrogenation reactions, and frequently for other reactions, a low surface area palladium on alumina catalyst is desired. In order to reduce the surface area of the alumina catalyst base, the active alumina employed is calcined at a temperature sufficiently high to break up some of the catalyst pores. Normally a temperature in the range of 1600° F. to 2000° F. is employed. However, alumina which has been heat treated at these high temperatures does not have the strength properties desired for many uses. For this reason alumina is frequently combined with silica or clay. This modification makes the catalyst stronger as shown by an increase in catalyst crush strength values. However the quantity of silica or clay necessary oftentimes changes the character of the catalyst. In accordance with this invention it has been found that strength properties of palladium on alumina catalysts are markedly improved by spinelization. Within the contemplation of this invention a low surface area hydrogenation catalyst having superior strength properties, but otherwise having no discernible difference in properties, is made by impregnating active alumina with a sufficient quantity of a heat decomposable nickel salt to form 1 to 5 percent nickel-alumina spinel, and heating the impregnated alumina to a spinelization reaction temperature of 1800° F. to 2400° F. with oxygen available. This heat treatment decomposes the nickel salt, and with oxygen present, forms one to five percent nickel-alumina spinel throughout the alumina by the end of the heat treatment. The nickel spinel-modified alumina is then impregnated with 0.01 to 5 percent, preferably 0.05, of a heat decomposable palladium salt. The resulting composition is then calcined (800° F. to 1000° F.) to form a palladium hydrogenation catalyst. Thus by the practice of this invention the aluminum oxide matrix is modified by nickel alumina spinelization so that the nickel alumina spinel structure constitutes one to five percent, preferably three percent, by weight of the alumina spinel matrix. More than five percent spinel can be used in the modification. However, no advantages are achieved thereby. For example, a modification of, say, 5.8 percent, is no better than a silght modification of one percent.

Spinelization is a well known process, and such spinels as $MnOAl_2O_3$, $CoOAl_2O_3$, $NiOAl_2O_3$ and $MgOAl_2O_3$ are well known. By the process of this invention $NiOAl_2O_3$ is formed, and X-ray diffraction shows the spinel to have been formed throughout the catalyst base. Spinel formation is also visible throughout the matrix by virtue of the color change, the alumina carrier changing to a light blue-green color throughout. Nicked modification has been used with palladium, and such a modification is described in U.S. 2,982,793. A roasting temperature of 650° C. to 1000° C. is disclosed in that patent. However the temperature and the roasting period within the ranges disclosed lie below that at which substantial transition to alpha alumina occurs during the period of roasting. This is possible as exemplified by heating spheres of the alumina employed in Example I which follows, the spheres being dipped in sufficient nickel nitrate so that on decomposition of the nickel salt the catalyst contains 3 weight percent nickel. X-ray analysis of a portion of these spheres heated at 1832° F. for one hour shows no alpha alumina and no nickel-alumina spinel to be present. Another quantity fospheres heated at 1832° F. for eight hours was found to contain a minor amount (less than 25 percent) of alpha alumina but no nickel-alumina spinel.

The purpose of refiling my original application is to bring out in this application the fact that the formation of a major amount of alpha alumina (over 75 percent) is inherent in nickel-alumina spinelization. As an example a composition containing 5 percent nickel-alumina spinel prepared according to Example 1 was found, based on ASTM X-ray diffraction patterns 10–173 and 10–339, to contain over 90 percent alpha alumina. Obviously as more nickel-alumina spinel is present in the alumina matrix, less of the alumina will be in the alpha form. Nevertheless in all of the catalysts described herein where nickel-alumina spinel is present, a major quantity of the alumina in the carrier is in the form of alpha alumina.

As will be shown, catalysts resulting from the process of this invention are outstanding acetylene hydrogenation catalysts. They have low surface areas, e.g. 10 to 50 square meters per gram, due to the high spinelization temperatures, and vastly improved strength properties. The improvement in strength properties conferred by spinelization in accordance with this invention can, as has been indicated, be best exemplified by reference to crush strengths. This is illustrated by the following examples.

Example 1

The alumina carrier employed herein was a commercially available active alumina manufactured by carefully controlled calcination of beta trihydrate having a surface area of 360 m.$^2$/gm. Crush strengths run on pellets at various stages of production demonstrate the improvement conferred by spinelization as set forth in Table 1. For uniformity and comparison all crush strengths were conducted on approximately one-fourth inch pellets (four mesh screened) using the well known procedure involving weight loading.

TABLE I

|   | Lbs. |
|---|---|
| (a) Alumina initial crush strength | 17.3 |
| (b) Alumina calcined at 1800° F. 24 hrs. to reduce surface area | 12.8 |
| (c) Alumina calcined at 2400° F. 24 hrs. | 9.5 |
| (d) Spinel modified alumina (2.5% nickel spinel) calcined at 2400° F. 24 hrs. | 21.0 |

To obtain the data in Table I the alumina pellets for (a), (b), and (c) were calcined as pelleted. For sample (d) the alumina was impregnated throughout with sufficient nickel nitrate to form 2.5 percent nickel spinel (about 3 percent nickel nitrate based on the alumina), dried and pelleted. The pellets were calcined by heating in an oven at various temperatures shown in Table I. X-ray analysis showed no NiO in the catalyst base. Its surface area was 18 m.$^2$/gm.

Example 1 shows that to reduce the surface area to about 18 m.$^2$/gm. would result in poor physical properties (crush strength 12.8 lbs.). The spinel-modified catalyst, however, has a crush strength of 21 lbs. Reference to Example 2 shows similar results.

Example 2

A different sample of alumina obtained from the same source as Example 1, but having a higher initial crush strength, was employed herein. The surface area of the alumina was 360 m.$^2$/gm. For the purpose of comparison the unmodified alumina pellets were heat treated. Spinel-modified samples, formed at 2100° F., were also prepared, and compared with the unmodified alumina. This comparison is given in Table II, N.S. being nickel spinel. The pellets employed were those passing a 4 by 8 mesh screen test.

TABLE II

| | |
|---|---|
| (e) Alumina initial crush strength | 32.9 |
| (f) Alumina calcined at 1600° F. | 24.8 |
| (g) Spinel modified alumina (1% N.S.[1] calcined at 2100° F. | 21 |
| (h) Spinel modified alumina (2.5% N.S[1]) calcined at 2100° F. | 22 |
| (i) Spinel modified alumina (5.8% N.S.[1]) calcined at 2100° F. | 21 |

[1] Quantity of nickel spinel in carrier.

In using the catalyst of the present invention, a gas stream of ethylene, containing acetylene to be removed, is admixed with a gas stream of hydrogen, unless an excess of hydrogen is already present in the ethylene-acetylene gas, and the resulting mixture is passed into contact with the catalyst herein described. The gas mixture can also contain other materials, such as hydrocarbons, normally incident to the preparation of the ethylene-containing gas, as well as nitrigen, carbon dioxide, small proportions of air, and water vapor. However, the gas stream should be free of sulfur-containing compounds and, if necessary, a known sulfur absorber, such as basic lead acetate or the equivalent, can be employed to remove sulfur compounds from the feed mixture before contacting that mixture with the hydrogenation catalyst.

The proportion of hydrogen which should be present in, or be added to, the ethylene gas is at least that proportion necessary to hydrogenate all of the acetylene present in the mixture, i.e., one mol or more of hydrogen per mol of acetylene. An excess of hydrogen over that theoretically necessary to react with all of the acetylene is usually required in practical operation. Usually, however, the proportion of hydrogen will be in excess of that which satisfactorily removes acetylene from the treated gas product.

The selective hydrogenation of acetylene from an ethylene steam using palladium supported on activated alumina is well known. To catalyze the selective hydrogenation of acetylenes, temperatures of 100° F. to 400° F., pressures of 15 to 1000 pounds per square inch guage, and space velocities of 500 to 7000 volumes of gas per volume of catalyst per hour and higher are employed. These same conditions are employed with the low surface area catalysts of this invention. Normally the gas stream will contain no more than two percent acetylene.

The following example illustrates the effectiveness of the spinel modified catalyst of this invention as an acetylene hydrogenation catalyst. The catalyst, Catalyst $j$, was prepared as follows:

(a) Impregnate 100 lbs. of alumina $a$ pellets (surface area 360 m.$^2$/gm.) with 3 lbs. nickel nitrate based on alumina dissolved in that predetermined quantity of water which will be absorbed by the alumina.

(b) Allow to stand about 30 minutes; then dry at 250° F. and calcine at 2400° F.

(c) Repeat the procedure with 0.05 lb. of palladium chloride, calcining at 900° F.

Example 3

In this example catalyst $j$, having a surface area of 18, is compared with a palladium on alumina catalyst also containing 0.05 percent palladium, but having a surface area of 300 m.$^2$/gm. (catalyst $k$).

TABLE III

Catalyst: k
Gas (mols): Acetylene, 0.62; Hydrogen, 1.26

| Temp., °F. | SV | Pressure (p.s.i.g.) | $C_2H_2$ out, p.p.m. | $H_2$ out, p.p.m. |
|---|---|---|---|---|
| 85 | 2,000 | 400 | 1,209 | 5,956 |
| 90 | 2,000 | 400 | 1,900 | 1,190 |
| 105 | 2,000 | 400 | 1,412 | 690 |
| 315 | 2,000 | 400 | 416 | 0 |

Catalyst: j
Gas (mols): Acetylene, .983; Hydrogen, 2.01

| Temp., °F. | SV | Pressure (p.s.i.g.) | $C_2H_2$ out, p.p.m. | $H_2$ out, p.p.m. |
|---|---|---|---|---|
| 95 | 4,000 | 300 | 40 | 1,200 |
| 120 | 4,000 | 300 | 4 | 200 |
| 150 | 4,000 | 300 | 0 | 150 |
| 175 | 4,000 | 300 | 25 | 50 |
| 240 | 4,000 | 300 | 101 | 0 |

The foregoing examples show that an effective hydrogenation catalyst is provided by this invention. Given the low surface area catalyst base, various uses and palladium modifications will occur to one skilled in the art. Such variations and ramifications are deemed to be within the scope of this invention.

What is claimed is:

1. A hydrogenation catalyst having improved strength properties comprising a modified aluminum oxide catalyst base impregnated with 0.01 to 5 weight percent palladium, the catalyst base consisting essentially of 1 to 5 weight percent nickel-alumina spinel distributed throughout an alumina matrix the major portion of which is alpha alumina formed during nickel-alumina spinelization, the surface area of the catalyst base being 10 to 50 square meters per gram.

2. A process for selectively hydrogenating acetylene present in a gas stream containing ethylene which comprises passing said stream in combination with hydrogen through a bed of the catalyst of claim 1 under a total pressure of from 15–1000 lb./in.$^2$ and at a temperature of from 100–400° F.

3. The catalyst of claim 1 containing 3 percent nickel-alumina spinel, the catalyst base having been impregnated with 0.05 percent palladium.

References Cited

UNITED STATES PATENTS 3,271,325   9/1966   Davies _____ 252—466

PATRICK P. GARVIN, Primary Examiner
PHILIP M. FRENCH, Assistant Examiner

U.S. Cl. X.R.

252—466; 260—683.9